United States Patent [19]

Smith et al.

[11] Patent Number: 5,607,902
[45] Date of Patent: Mar. 4, 1997

[54] METHOD OF TREATING SHALE AND CLAY IN HYDROCARBON FORMATION DRILLING

[75] Inventors: Kevin W. Smith, McMurray; Todd R. Thomas, Coraopolis, both of Pa.

[73] Assignee: ClearWater, Inc., Pittsburgh, Pa.

[21] Appl. No.: 610,739

[22] Filed: Mar. 4, 1996

Related U.S. Application Data

[63] Continuation of Ser. No. 154,535, Nov. 19, 1993, abandoned.

[51] Int. Cl.$^6$ ........................................ C09K 7/02
[52] U.S. Cl. .................... 507/120; 507/121; 507/225; 507/226; 507/119
[58] Field of Search ........................ 507/119, 120, 507/225, 226, 121

[56] References Cited

U.S. PATENT DOCUMENTS

| | | | |
|---|---|---|---|
| 2,761,835 | 9/1956 | Brown | 252/8.55 |
| 4,100,079 | 7/1978 | Sinkovitz et al. | 252/8.55 |
| 4,225,445 | 9/1980 | Dixon | 252/8.55 |
| 4,293,427 | 10/1981 | Lucas et al. | 252/8.5 |
| 4,305,860 | 12/1981 | Iovine et al. | 260/29.6 |
| 4,374,739 | 2/1983 | McLaughlin et al. | 252/8.55 R |
| 4,393,939 | 7/1983 | Smith et al. | 166/293 |
| 4,447,342 | 5/1984 | Borchardt et al. | 252/8.55 D |
| 4,455,240 | 1/1984 | Costello | 507/119 |
| 4,460,627 | 7/1984 | Weaver et al. | 427/212 |
| 4,476,931 | 10/1984 | Boles et al. | 507/119 |
| 4,533,708 | 8/1985 | Costello | 526/295 |
| 4,536,292 | 8/1985 | Matz | 210/701 |
| 4,652,623 | 3/1987 | Chen et al. | 526/287 |
| 4,690,996 | 9/1987 | Shih et al. | 527/312 |
| 4,726,906 | 2/1988 | Chen et al. | 252/8.514 |
| 4,772,462 | 9/1988 | Boothe et al. | 424/70 |
| 4,842,073 | 6/1989 | Himes et al. | 166/294 |
| 5,013,456 | 5/1991 | St. John et al. | 210/734 |
| 5,032,295 | 7/1991 | Matz et al. | 252/8.51 |
| 5,207,924 | 5/1993 | Reed et al. | 210/734 |
| 5,209,854 | 5/1993 | Reed et al. | 210/734 |

*Primary Examiner*—Philip Tucker
*Attorney, Agent, or Firm*—William L. Krayer

[57] ABSTRACT

Swelling and migration of subterranean clay is inhibited during drilling for and stimulation of the production of hydrocarbon fluids, and preparation therefor, by treating said formations with a copolymer of about 5% to about 50% of an anionic monomer such as acrylic acid, methacrylic acid, or 2-acrylamido-2-methyl propane sulfonic acid and the balance a cationic monomer selected from dimethyl diallyl ammonium chloride, or acryloxy or methacryloxy ethyl, propyl or 3-methyl butyl trimethyl ammonium chlorides or methosulfates. Permeability damage to the formation is reduced in the presence of the copolymer; it is particularly effective in spite of the presence of a foaming agent.

15 Claims, No Drawings

METHOD OF TREATING SHALE AND CLAY IN HYDROCARBON FORMATION DRILLING

This application is a continuation of application Ser. No. 08/154535 filed Nov. 19, 1993, now abandoned.

TECHNICAL FIELD

This invention relates to the drilling of underground formations for the production of oil, gas, and other formation fluids, including water, and particularly to the stabilization of boreholes whether or not to be used for the recovery of formation fluids, as in the case of mining test holes. This invention includes the treatment of subterranean shale and clay to prevent swelling caused by the absorption of water from drilling fluids. It relates particularly to the use of certain polymeric agents for the prevention of swelling of shale and clay in situ by the absorption of water, the consequent adverse effects of the entrance of clay and shale into the drilling system, and the adverse effects of clay and shale sloughing on borehole stability. The polymeric agents we use contain both cationic and anionic monomers. The cationic monomers are typified by dimethyl diallyl ammonium chloride ("DMDAAC"), and the anionic monomers are typified by acrylic acid and 2-acrylamido-2-methyl propane sulfonic acid ("AMPS"). The copolymers are shown to be effective for the above described purposes and especially insensitive to shear, while remaining compatible with anionic compounds such as alcohol ether sulfate and alpha olefin sulfonate-based foaming agents.

BACKGROUND OF THE INVENTION

A good description of the problem which this invention addresses in the context of drilling may be found in an article by Thomas W. Beihoffer et al in the May 16, 1992 Oil & Gas Journal, page 47 et seq, entitled "Cationic Polymer Drilling Fluid Can Sometimes Replace Oil-based Mud." As stated therein, "(S)hales can become unstable when they react with water in the drilling fluid. These reactive shales contain clays that have been dehydrated over geologic time by overburden pressure. When the formation is exposed, the clays osmotically imbibe water from the drilling fluid. This leads to swelling of the shale, induced stresses, loss of mechanical strength, and shale failure." Shale crumbling into the borehole ("sloughing") can ultimately place a burden on the drill bit which makes it impossible to retrieve.

Salts such as potassium chloride have been widely used in drilling treatments to convert the formation material from the sodium form by ion exchange to, for example, the potassium form which is less vulnerable to swelling; also the use of high concentrations of such potassium salts affects the osmotic balance and tends to inhibit the flow of water away from the high potassium salt concentrations into the shale. However, it is difficult to maintain the required high concentrations of potassium salts in the drilling fluids. In addition, the physical introduction of such salts causes difficulties with the preparation of the viscosifying polymeric materials typically used for drilling. Inorganic salts can also have a harmful effect on the environment if released. While in the above cited Beihoffer et al paper, the use of cationic polymers is suggested as a supplement for the potassium salts in drilling fluids, the authors do not propose the particular polymers we use, which we have found to be especially effective because of their resistance to shear and their compatibility with anionic agents, as well as their advantageous charge density.

The reader may be interested in "The Separation of Electrolyte Effects From Rheological Effects in Studies of Inhibition of Shales with Natural Moisture Contents" by Beihoffer et al, SPE Paper 18032, which also contains a complete description of the Roll Oven Test referred to below. It is incorporated by reference.

Foaming agents commonly used in air-foam drilling generally tend to be anionic surfactants. Such foaming materials are well known and frequently are ethoxylated and sulfated, such as alcohol ether sulfates. They may be mixed with alpha olefin sulfonates, and commercially may be in solvents, including organic solvents added for freeze resistance. Polymers used in the presence of such surfactants must be compatible with them. Also, the shear forces in air drilling can be particularly high, and any polymeric additive should be able to withstand turbulent flow conditions, i.e. a Reynolds Number of up to about 500,000. Most of the contemporary technology uses acrylamide-based copolymers that shear easily when subjected to such turbulent conditions.

SUMMARY OF THE INVENTION

We have found that the permeability of subterranean formations may be maintained during drilling, and other contact with aqueous fluids—that is, shales and clays can be inhibited from swelling, sloughing and retarding the flow of fluids—by including in the drilling or other fluid an effective amount of a polymer including (1) about 50–95% of a cationic monomer selected from (A) dimethyl diallyl ammonium chloride having the formula $[CH_2\!=\!CH\!-\!CH_2]_2N^+(CH_3)_2Cl^-$ ("DMDAAC"), (B) an acryloyloxy monomer of the formula $CH_2\!=\!CR\!-\!COR^1N(CH_3)_3$ or (C) an acrylamido monomer of the formula $CH_2\!=\!CR\!-\!CONR^1N(CH_3)_3$, where R is hydrogen or a methyl group, and $R^1$ is a connecting linear or branched saturated hydrocarbyl group having from one to about five carbon atoms, such cationic monomers copolymerized with (2) about 5-50% of acrylic acid, methacrylic acid, or a monomer of a formula

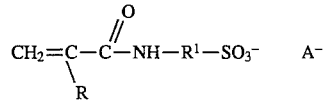

where R and $R^1$ are as above, and $A^-$ is an anion selected from chloride and methosulfate. Among the anionic comonomers useful in our invention are acrylic acid, 2-acrylamido-2-methyl propyl sulfonic acid ("AMPS"), and methacrylic acid. Useful cationic monomers in addition to DMDAAC include methylacryloxy ethyl trimethyl ammonium methosulfate ("METAMS"), acryloxy ethyl trimethyl ammonium methosulfate ("AETAMS"), methylacryloxy ethyl trimethyl ammonium chloride ("METAC"), acryloxy ethyl trimethyl ammonium chloride ("AETAC"), methyl acrylamido propyl trimethyl ammoniium chloride ("MAPTAC"), and 3-acrylamido-3-butyl trimethyl ammonium chloride ("AMBTAC"). The copolymers we use are compatible with foaming agents and can withstand highly turbulent flow conditions.

It is known that when DMDAAC polymerizes in an aqueous medium such as in the presence of a redox catalyst, it internally cyclizes; thus the DMDAAC copolymers we use are randomly copolymerized copolymers having the structural formula

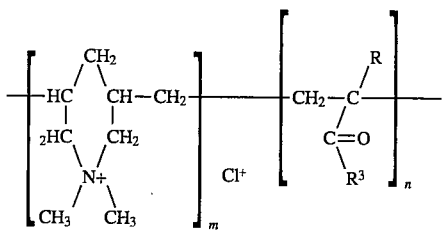

where m is the molar equivalent of about 50% to about 95% by weight of the polymer, n is the molar equivalent of about 5% to about 50 % by weight of the polymer, R is selected from hydrogen and methyl, and $R^3$ is the remainder of the (meth)acrylamido or (meth)acryloxy group of the anionic monomer described above, such as $O^-$ or $CONHC(CH_3)_2CH_2SO_3$, with an associated hydrogen or other common cation. These materials can stabilize shales and clays encountered during drilling, and they can do so under the effects of strong shear forces and in the presence of anionic, cationic or nonionic materials such as foaming agents.

As has been documented many times in the literature, shales commonly include clays which may cause difficulties. Examples are clays of the montmorillonite (smectite) group such as saponite, nontronite, hectorite, and sauconite as well as montmorillonite itself; the kaolin group such as kaolinite, nacrite, dickite, and halloysite; the hydrousmica group such a hydrobiotite, glauconite, illite and bramalite; the chlorite group such as chlorite and chamosite, and in addition vermiculite, attapulgite and sepiolite and mixed-layer varieties of the above minerals and groups. The entire specification of Himes and Vinson U.S. Pat. No. 4,842,073 is incorporated herein by reference as it should be understood that the present invention is applicable in all respects to the conditions and environment described in the '073 patent.

Our copolymers may have average molecular weights from about 1000 to about 1,000,000 and preferably in the range of about 20,000 to about 1,000,000. Copolymers of acrylic acid and DMDAAC may be made by the methods described by Boothe et al in U.S. Pat. No. 4,772,462, and particularly as referenced to Butler and Angelo JACS v 29, p 3128 (1957) or the technique suggested in U.S. Pat. No. Re 28,543, and the other copolymers described herein may be made in a similar manner. They may be used in admixture with the stimulation fluid in an amount effective to stabilize the formation against permeability damage at least to some degree as a result of contact with the aqueous fracturing fluid. The copolymer is generally admixed with the aqueous fracturing fluid in an amount of at least about 50 parts (or at least about 0.05%) by weight per million parts by weight of the fracturing fluid. Preferably our copolymer (DMDAAC/ acrylic acid copolymer or other copolymer as described herein) is present in an amount of from about 50 to about 50,000 parts per million of the aqueous fracturing fluid; most preferably about 1000 to about 8000 parts per million. In the case of DMDAAC/acrylic acid copolymers, we prefer about 80–95% DMDAAC to about 5–20% acrylic acid. Very small-amounts have at least some beneficial effects. An effective amount may be determined by estimates of the amount of clay in the formation using representative core samples in standard core flow testing as is known in the art or by roll oven testing as described below.

The copolymer may be admixed with the drilling fluid at any time prior to contact of the fluid with the subterranean formation. It is readily mixed with the constituents of the aqueous phase of drilling or stimulation fluid both prior to and subsequent to hydration of the gelling agent. The most commonly used gelling agents presently are bentonite clays, polysaccharides and in particular natural guar, hydroxypropyl guar, polyacrylamide, carboxymethylcellulose, hydroxyethylcellulose, and xanthan gum, but our treating agents are compatible with any and all such materials as well as foaming agents and may be used without them. The polysaccharide or other gelling agent may be used in a hydrocarbon solvent to form a "liquid gel concentrate." Our copolymers are also compatible with such concentrates, and also, as is shown below, with commonly used foaming agents. The ratios of polymer to foaming agent may vary widely, but will typically be about 20:1 to about 1:20 by weight.

The drilling or fracturing fluid may thus comprise, for example, a gelling agent, a foaming agent, KCl, and my copolymer.

DETAILED DESCRIPTION OF THE INVENTION

Table I shows that the polymers we use are stable to shear. Roll oven tests were conducted with and without the samples having been subjected to shear. All polymers were at 400 ppm and contained 2000 ppm of a common anionic surfactant. Shearing was accomplished by preparing a 2.5 gallon sample of polymer and passing it through a ceramic choke with a 1000 psi pressure differential at 4 gallons per minute for 30 minutes. The water used was brine water. The shale samples were ground to −4 to +10 mesh. Seven grams of sized shale was placed with 50 ml of test fluid in an oven rolling jar. The jars were rolled in the oven for 16 hours at 125 degrees F., then removed and cooled. The granules were collected on a 30 mesh screen, washed gently with distilled water and dried at 95 degrees until no further change in weight was observed. The percent shale recovery was then calculated as the weight remaining on the 30 mesh screen divided by the original weight.

TABLE I

| Sample | Shear | % Recovery |
|---|---|---|
| 83D/17MAA | NO | 87.50 |
| 83D/17MAA | YES | 88.78 |
| 90D/10MAA | NO | 85.77 |
| 90D/10MAA | YES | 88.73 |
| 85D/15K+AA | NO | 87.78 |
| 85D/15K+AA | YES | 88.35 |
| 85D/15NH$_3$AA | NO | 80.85 |
| 85D/15NH$_3$AA | YES | 88.65 |
| 95D/5MAA | NO | 88.87 |
| 95D/5MAA | YES | 88.18 |
| 85D/15NH$_3$AA | NO | 94.34 |
| 85D/15NH$_3$AA | YES | 84.94 |
| 85D/15NH$_3$AA | NO | 88.29 |
| 85D/15NH$_3$AA | YES | 85.31 |
| 90D/10NH$_3$AA | NO | 80.09 |
| 90D/10NH$_3$AA | YES | 84.96 |

The materials are seen to be little affected by shear.

Additional Roll oven tests were performed on other polymers useful in my invention, and the results are reported in Table II:

TABLE II

| Copolymer | Percent Recovery |
|---|---|
| 88DMDAAC/12AMPS | 68.1 |
| 74AETAMS/26MAA | 26.3 |
| 91AETAC/9AA | 70.4 |
| 91METAMS/5AA | 84.2 |

In Table II, "DMDAAC" is, as above, dimethyl diallyl ammonium chloride, "AMPS" is 2-acrylamido-2-methyl propane sulfonic acid, "AETAMS" is acryloxy ethyl trimethyl ammonium chloride, "MAA" is methacrylic acid, "AETAC" is acryloxy ethyl trimethyl ammonium chloride, "AA" is acrylic acid, and "METAMS" is methacryloxy ethyl trimethyl ammonium chloride. The numbers such as 12 and 91 represent the percentages of the monomers by weight in the copolymer.

That the DMDAAC/anionic copolymers are compatible with foaming agents is demonstrated in Table III. In Table III, the weight ratio of DMDAAC to acrylic acid in a test polymer is written, for example, as 85D/A15, meaning 85% by weight DMDAAC and 15% acrylic acid. The weight ratio of polymer to foaming agent is indicated by Poly/Fm; FW/Br means the salinity of the aqueous carrier in the proportion of fresh water to 15% brine. The test was conducted to determine the foam height and its stability in a procedure as follows: 100 cc of the test solution containing 0.32% of the polymer/foam combination was placed in a Waring blender and subjected to a standard agitation for 30 seconds, the material was poured into a 1000 ml cylinder and the foam height immediately measured, and the half-life of the foam was measured in minutes and seconds. The half-life is the amount of time it took for one-half of the original solution to settle out of the foam.

TABLE III

| Exmpl | Compos | Foamr | Poly/Fm | FW/Br | FmHt | Hf lf |
|---|---|---|---|---|---|---|
| 1 | 85D/15A* | p | 90.9/9.1 | 100/0 | 580 | 4:42 |
| 2 | 49D/51A | p | 90.9/9.1 | 100/0 | 580 | 5:22 |
| 3 | 85D/15A | p | 90.9/9.1 | 100/0 | 590 | 5:28 |
| 4 | 85D/15A* | p | 90.9/9.1 | 0/100 | 230 | 0:37 |
| 5 | 85D/15A | p | 90.9/9.1 | 0/100 | 230 | 0:42 |
| 6 | 85D/15A* | p | 90.9/9.1 | 50/50 | 400 | 2:45 |
| 7 | 85D/15A | p | 90.9/9.1 | 50/50 | 380 | 2:25 |
| 8 | 85D/15A | p | 90.9.9.1 | 100/0 | 570 | 4:40 |
| 9 | 75D/25A | q | 10/90 | 0/100 | 320 | 1:55 |
| 10 | 75D/25A | q | 5/95 | 100/0 | 510 | 5:10 |
| 11 | 75D/25A | q | 10/90 | 100/0 | 350 | 2:12 |
| 12 | 75D/25A | q | 5/95 | 20/80 | 360 | 2:18 |
| 13 | 75D/25A | q | 5/95 | 40/60 | 360 | 2:17 |
| 14 | 75D/25A | q | 5/95 | 60/40 | 470 | 3:18 |
| 15 | 90D/10A | q | 10/90 | 40/60 | 400 | 2:35 |
| 16 | 90D/10A | q | 10/90 | 60/40 | 450 | 2:47 |
| 17 | 49D/51A | r | 90.9/9.1 | 100/0 | 550 | 5:08 |
| 18 | 85D/15A | r | 90.9/9.1 | 100/0 | 550 | 4:53 |
| 19 | 85D/15A* | r | 90.9/9.1 | 100/0 | 580 | 4:04 |
| 20 | 49D/51A | q | 7.4/92.6 | 100/0 | 530 | 4:44 |
| 21 | 49D/51A | q | 7.4/92.6 | 75/25 | 540 | 4:40 |
| 22 | 49D/51A | q | 7.4/92.6 | 50/50 | 510 | 4:15 |

*Very low molecular weight, i.e. about 1000 to about 10,000.

Foamers: "p" is a solvent-containing mixture of common anionic surfactants, namely alcohol ether sulfates and alkyl sulfonates, chosen for their ability to foam in fresh water or brine having up to 5% salt; "q" is a commercially available mixture of anionic surfactants chosen for their ability to foam in brine having as much as 23% salt; "r" is "Neodol 91-2.5" a mixture of linear alcohol ethoxylates having 2.5 moles EO per mole of alcohol.

Table IV also demonstrates foam heights and lives for four additional copolymers in varied concentrations of brine. In Table IV, the column titled "Fluid" presents the weight ratio of fresh water to 23% brine used in the experiment. In each case, the surfactant was "p" as defined above.

TABLE IV

| | Fluid | Foam Ht | Half Life |
|---|---|---|---|
| Control (no polymer) | 100/0 | 540 | 4:44 |
| | 75/25 | 540 | 4:43 |
| | 50/50 | 500 | 4:25 |
| | 25/75 | 400 | 4:07 |
| | 0/100 | 360 | 3:01 |
| 88DMDAAC/12AMPS | 100/0 | 450 | 2:05 |
| | 75/25 | 480 | 3:55 |
| | 50/50 | 480 | 4:28 |
| | 25/75 | 420 | 4:00 |
| | 0/100 | 370 | 2:50 |
| 74AETAMS/26MAA | 100/0 | 600 | 4:58 |
| | 75/25 | 560 | 4:02 |
| | 50/50 | 520 | 4:00 |
| | 25/75 | 430 | 4:05 |
| | 0/100 | 360 | 3:46 |
| 91AETAC/9AA | 100/0 | 460 | 2:22 |
| | 75/25 | 530 | 5:24 |
| | 50/50 | 480 | 4:03 |
| | 25/75 | 420 | 3:06 |
| | 0/100 | 370 | 3:02 |
| 95METAMS/5AA | 100/0 | 450 | 2:02 |
| | 75/25 | 550 | 4:14 |
| | 50/50 | 490 | 3:28 |
| | 25/75 | 410 | 3:20 |
| | 0/100 | 370 | 3:03 |

The meanings of AETAMS, AETAC, AND METAMS are as indicated above.

We claim:

1. Method of reducing permeability damage in a subterranean formation from contact of a treatment fluid with said subterranean formation comprising contacting the subterranean formation with an aqueous solution of said treatment fluid containing a formation control additive consisting essentially of (A) a foaming agent, and (B) a linear copolymer comprising (1) about 50% to about 95% by weight of a cationic monomer selected from (a) diallyl ammonium monomers of the formula $CH_2=CH-CH_2)_2N^+(CH_3)_2Cl^-$ (b) acryloyloxy monomers of the formula $CH_2=CR-COR^1N^+(CH_3)_3A^-$ where $A^-$ is an anion selected from chloride and methosulfate and (c) acrylamido monomers of the formula $CH_2=CR-CONR^1N^+(CH_3)_3\ A^-$ where $A^-$ is an anion selected from chloride and methosulfate and (2) about 5% to about 50% of an anionic monomer of the formula $CH_2=CRCOR_2$ where R is hydrogen or $CH_3$, $R^1$ is a connecting linear or branched saturated hydrocarbyl group having from one to about five carbon atoms, and $R^2$ is OH or $-NHR^1SO_3^-$.

2. Method of claim 1 wherein said copolymer is present in an amount of at least about 10 ppm by weight of the treatment fluid.

3. Method of claim 1 wherein said copolymer is present in an amount of about 50 ppm to about 50,000 ppm by weight of the treatment fluid.

4. Method of claim 1 wherein said copolymer is present in an amount of from about 1000 ppm to about 8000 parts per million parts of the treatment fluid.

5. Method of claim 1 wherein the treatment fluid includes a gelling agent to viscosify the treatment fluid.

6. Method of claim 1 wherein the copolymer comprises about 80% to about 95% monomer of the formula $(CH_2=CH-CH_2)_2N^+(CH_3)_2Cl^-$.

7. Method of claim 1 wherein the foaming agent is present in the treatment fluid in a ratio to the copolymer of about 1:20 to about 20:1.

8. Method of claim 1 wherein the copolymer is a copolymer of dimethyl diallyl ammonium chloride and acrylic acid.

9. Method of claim 1 wherein the average molecular weight of the polymer is about 20,000 to about 1,000,000.

10. The method of stimulating production of hydrocarbons from a clay-containing subterranean formation comprising contacting said formation with an effective amount of an aqueous treatment fluid consisting essentially of an aqueous fluid, a foaming agent and a linear copolymer of acrylic acid and at least about 50% by weight dimethyl diallyl ammonium chloride under conditions such that either a fracture is caused to be created or the fluid contacts said formation whereby the subsequent production of hydrocarbons is facilitated, said formation control additive being present in said treatment fluid in an effective amount whereby permeability damage resulting from contact of the clays in the formation with the aqueous fluid in the treatment fluid is reduced.

11. Method of claim 10 wherein said copolymer is present in an amount in excess of about 0.05% by weight of said aqueous treatment fluid.

12. Method of claim 10 wherein said copolymer is present in an amount of from about 0.1 to about 5% by weight of said aqueous treatment fluid.

13. Method of claim 10 wherein said copolymer is a copolymer of about 10% to about 20% by weight acrylic acid and the balance dimethyl diallyl ammonium chloride.

14. Method of claim 10 wherein said foaming agent is alcohol ether sulfate mixed with alpha olefin sulfonate and solvents.

15. Method of claim 10 wherein the foaming agent is present in amount from about 0.1% to about 5%.

* * * * *